United States Patent
Mody et al.

(10) Patent No.: US 12,125,122 B2
(45) Date of Patent: Oct. 22, 2024

(54) FAULT DETECTION IN A REAL-TIME IMAGE PIPELINE

(71) Applicant: TEXAS INSTRUMENTS INCORPORATED, Dallas, TX (US)

(72) Inventors: Mihir Narendra Mody, Bengaluru (IN); Niraj Nandan, Plano, TX (US); Ankur Ankur, New Delhi (IN); Mayank Mangla, Allen, TX (US); Prithvi Shankar Yeyyadi Anantha, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 86 days.

(21) Appl. No.: 17/556,161

(22) Filed: Dec. 20, 2021

(65) Prior Publication Data
US 2023/0196497 A1    Jun. 22, 2023

(51) Int. Cl.
*G06T 1/20* (2006.01)
*G06F 9/48* (2006.01)
(Continued)

(52) U.S. Cl.
CPC ............... *G06T 1/20* (2013.01); *G06F 9/4812* (2013.01); *G06F 11/1004* (2013.01); *G06T 1/60* (2013.01)

(58) Field of Classification Search
CPC . G06T 1/20; G06T 1/60; G06F 9/4812; G06F 11/1004; G06F 11/0736;
(Continued)

(56) References Cited

U.S. PATENT DOCUMENTS

| 11,327,525 B1 * | 5/2022 | Salluzzo | G06F 1/14 |
| 2016/0239941 A1 * | 8/2016 | Lee | G06T 1/20 |

(Continued)

FOREIGN PATENT DOCUMENTS

EP    3353769 B1    9/2022

OTHER PUBLICATIONS

Extended European Search Report for 22213359.7, dated Apr. 20, 2023.

*Primary Examiner* — James A Thompson
*Assistant Examiner* — Kim Thanh T Tran
(74) *Attorney, Agent, or Firm* — Brian D. Graham; Frank D. Cimino; Xianghui Huang (57) ABSTRACT

A technique including receiving an image stream for processing; processing the received image stream in a real time mode of operation; outputting an indication that an image processing pipeline has begun processing the received image stream; receiving, in response to the indication, first configuration information associated with test data for testing the image processing pipeline; switching the image processing pipeline to a non-real time mode of operation to process the test data based on the first configuration information during a vertical blanking period of the received image stream; loading the test data from an external memory; switching an input of the image processing pipeline from the image stream to the test data; determining a checksum based on the processed test data; comparing the determined checksum to an expected checksum to determine that the test data was successfully processed; and outputting an indication that the test data was successfully processed.

20 Claims, 6 Drawing Sheets

(51) Int. Cl.
*G06F 11/10* (2006.01)
*G06T 1/60* (2006.01)

(58) Field of Classification Search
CPC .. G09G 2330/12; G09G 5/363; H04N 23/667; H04N 17/002
See application file for complete search history.

(56) References Cited

U.S. PATENT DOCUMENTS

2017/0094268 A1* 3/2017 Gulati ..................... G09G 5/39
2017/0195617 A1* 7/2017 Zhang ............ H04N 21/440263
2020/0084437 A1* 3/2020 Feekes ................ G06F 11/0736
2022/0100601 A1* 3/2022 Baum ................ G06F 11/1608

* cited by examiner

FAULT DETECTION IN A REAL-TIME IMAGE PIPELINE

BACKGROUND

Increasingly, camera systems are being used to aid vehicle guidance and maneuvering. As an example, vehicles, such as cars, airplanes; robots, etc., are being equipped with external cameras to provide to the operator of the vehicle external views of the area surrounding the vehicle. These external views are commonly used to help maneuver the vehicle, such as when backing up or parking a car. These external views operate as a safety system as they can help vehicle operators detect and avoid objects, people, animals, etc., that may not be otherwise visible.

SUMMARY

Aspects of this disclosure relate to a technique for testing an image signal processing pipeline. The device includes an image signal processor including a multiplexer and an image processing pipeline. The image processing pipeline is configured to receive an image stream for processing. The image processing pipeline is also configured to process the received image stream in a real time mode of operation. The image signal processor also includes a scheduler module configured to determine that the image processing pipeline has begun processing the received image stream. The scheduler module is also configured to output a first indication that the image processing pipeline has begun processing the received image stream. The scheduler module is further configured to receive, in response to the first indication, first configuration information associated with test data for testing the image processing device. The scheduler module is also configured to switch the image processing pipeline to a non-real time mode of operation to process the test data based on the first configuration information during a vertical blanking period of the received image stream. The scheduler module is further configured to load the test data from an external memory. The multiplexer is configured to switch an input of the image processing pipeline from the image stream to the test data. The image signal processor further includes a checksum module configured to determine a checksum based on the processed test data and compare the determined checksum to an expected checksum to determine that the test data was successfully processed. The scheduler module is further configured to output a second indication that the test data was successfully processed.

Another as aspect of the present disclosure relates to a method comprising receiving an image stream for processing, processing the received image stream in a real time mode of operation, outputting a first indication that an image processing pipeline has begun processing the received image stream, receiving, in response to the first indication, first configuration information associated with test data for testing the image processing pipeline, switching the image processing pipeline to a non-real time mode of operation to process the test data based on the first configuration information during a vertical blanking period of the received image stream, loading the test data from an external memory, switching an input of the image processing pipeline from the image stream to the test data, determining a checksum based on the processed test data, comparing the determined checksum to an expected checksum to determine that the test data was successfully processed, and outputting a second indication that the test data was successfully processed.

Another aspect of the present disclosure relates to a non-transitory program storage device comprising instructions stored thereon to cause one or more processors to transmit first configuration information to an image processing pipeline to configure the image processing pipeline to process an image stream in a real time mode of operation. The instructions further cause the one or more processors to receive a first indication that an image processing pipeline has begun processing the received image stream. The instructions also cause the one or more processors to determine to test the image processing pipeline based on test data. The instructions further cause the one or more processors to transmit second configuration information associated with test data for testing the image processing pipeline during a vertical blanking period of the image stream in a non-real time mode of operation of the image processing pipeline. The instructions also cause the one or more processors to receive a second indication that that the image processing pipeline has begun processing the test data. The instructions further cause the one or more processors to transmit, in response to the second indication, third configuration information to configure the image processing pipeline to process the image stream in the real time mode of operation and receive a third indication that the test data was successfully processed.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

Camera systems are increasingly being used to aid to vehicle operators for maneuvering and safely navigating a vehicle in an area. Failure of such camera systems can increase risks as vehicle operators may not be able to detect hazards around the vehicle as well as if an operation camera system were present. Failure of the camera system may be divided into two general categories, transient faults and permanent faults. Generally, transient faults refer to failures that are temporary and may resolve by themselves, by resetting the camera system, switching to a redundant pathway, etc. Transient faults typically are due to erroneous input data or signal and may be caused by a variety of environmental conditions, such as high-energy neutron and/or alpha particle strike, temporary high electro-magnetic radiation exposure, dirt/mud covering the camera lens, etc. Permanent faults refer to failures which are reproducible and which do not go away. Usually, permanent faults are due to a hardware failure as a result of environmental conditions such as aging, shock, excessive vibration, accidents, etc. To help reduce the potential for increased risk as a result of camera system failure, it may be useful to have a technique to detect permanent faults in an image pipeline.

Figure 1A:
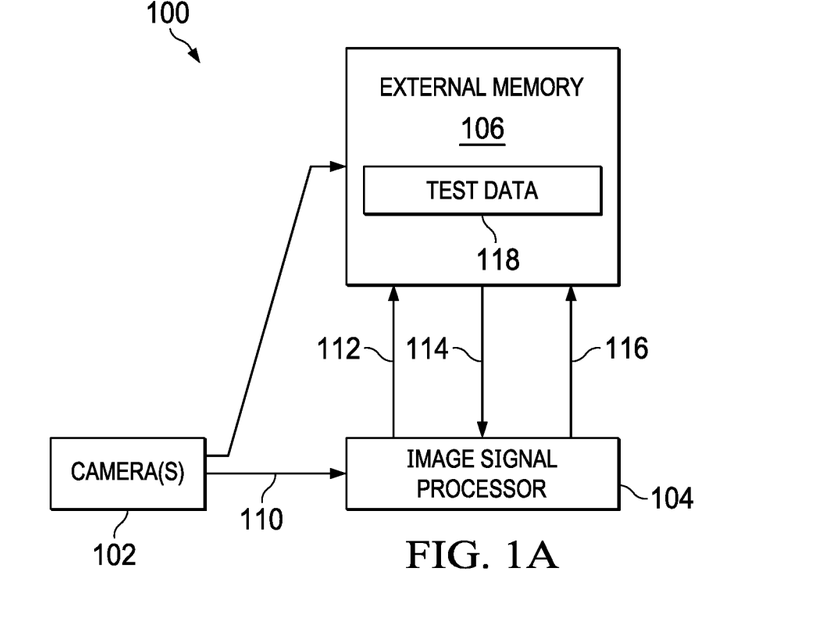
FIG. 1A is a block diagram illustrating an imaging system, in accordance with aspects of the present disclosure.

FIG. 1A is a block diagram illustrating an imaging system 100, in accordance with aspects of the present disclosure. This simplified example imaging system 100 includes one or more cameras 102 coupled to an image signal processor (ISP) 104. In some cases, the ISP 104 may be integrated as a part of a system on a chip (SoC, not shown), which includes multiple components configured to perform different tasks. The cameras 102 and ISP 104 are also coupled to an external memory 106. Examples of the external memory 106 may include double data rate (DDR) memory, dynamic random access memory (DRAM), flash memory, etc., and the external memory 106 may be on a separate chip from the ISP 104 and/or SoC. The external memory 106 may be memory dedicated for use by the ISP 104 and/or cameras 102 or the external memory 106 may be shared between the imaging system (e.g., ISP 104 and/or cameras 102) and other components, such as those on the SoC.

The ISP 104 may operate in multiple modes. For example, the ISP 104 may operate in a real-time (RT) or a non-RT mode. In the RT mode the ISP 104 may directly receive an input signal 110 from the cameras 102 and process the received input signal via an image pipeline (not shown) of the ISP. Generally, in the RT mode, the ISP 104 is continuously receiving the input signal 110 from the cameras 102 and the ISP 104 will output 112 processed images from the input signal 110 to the external memory 106 within an allotted amount of time. In the RT mode, the cameras 102 generally may not access the external memory 106. The ISP 104 processes the input signal 110 within the allotted amount of time to keep up with the input signal 110 from the cameras 102. This RT mode may be used, for example, while capturing live images from the cameras 102. The RT mode may offer guaranteed times to process and capture images as the image data is received from the camera.

In the non-RT mode, the ISP 104 may receive input data 114 from the external memory 106 and process the input data 114 to generate image data for output 116 to the external memory 106. As an example, the cameras 102 may be coupled to the external memory 106 and may output 116 image data to the external memory 106 for storage. As a more specific example, the cameras 102 may be configured to capture image data for images into a buffer on the external memory 106 to provide a past view, for example, to provide images for an under-vehicle view, images before a certain event is detected, etc. The input data 114 may be output by the external memory 106 for processing by the ISP 104.

Figure 1B:
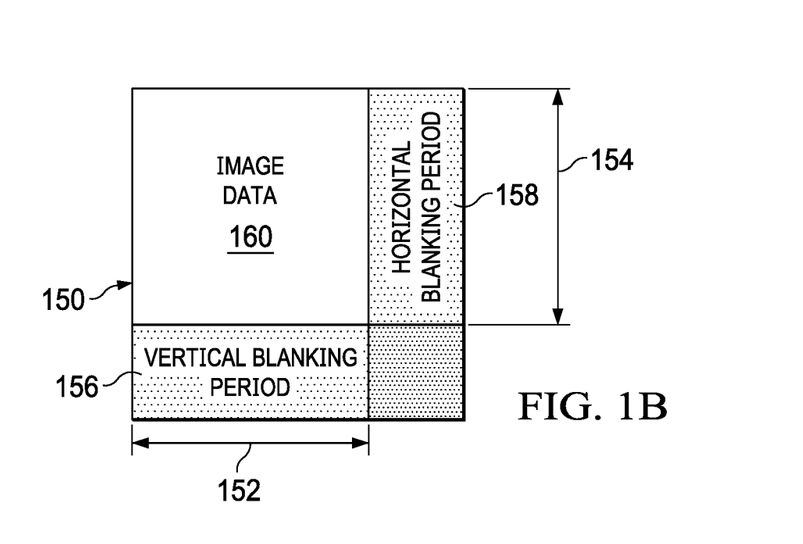
FIG. 1B is a conceptual diagram of the input frame from the camera, in accordance with aspects of the present disclosure.

FIG. 1B is a conceptual diagram of the input frame 150 from the camera, in accordance with aspects of the present disclosure. In some cases, the input frame 150 may be streamed to the ISP 104 as an input signal 110. For example, the input frame 150 may conceptually be streamed in blocks starting from the top right of the input frame 150 and moving to the right across one or more rows. The input frame 150 may include image data 160 along with a horizontal blanking signal 152 and a vertical blanking signal 154 which indicate whether the streamed data of the input frame is in a horizontal blanking period 158 and/or vertical blanking period 156, respectively. Some cameras, often those with a rolling shutter, may transmit a signal having a virtual frame including the horizontal blanking period 158 and vertical blanking period 156. The blanking periods may be used by a camera to extend an amount of time the camera has to capture an image. This extended time may be used to, for example, extend exposure times to help increase a quality of the captured images.

To help detect permanent faults, for example, in the ISP 104 and/or external memory 106, image test data 118 may be used. The image test data 118 may include one or more sets of input data as well as expected output data. This input data is configured to be processed by various features of the ISP 104 to produce an output that corresponds with the expected output data. This output data may be compared with the expected output data. If the output data corresponds with the expected output data, then a determination that there has not been a permanent fault may be made. If the output data does not correspond with the expected output data, then a determination that there has been a permanent fault may be made. Permanent faults may also be determined by running one or more built-in self tests (BISTs). These BISTs are typically tests built into the ISP 104 or other hardware components that are often configured to be executed on boot of the hardware component.

In some cases, there may be a need to perform tests to ensure that the ISP 104 is operating as expected while the ISP 400 is operating in the RT mode. However, executing BIST of the ISP 104 or using the image test data 118 to test the ISP 104 can be problematic when the ISP 104 and cameras 102 are being used in the RT mode as the ISP 104 is handling input data from the cameras 102 and there are operational time limits on how much time the ISP 104 can use to process each frame. Switching out of the RT mode and into the non-RT mode can cause delays and resulting in dropped frames. Techniques for permanent fault detection while the image pipeline is operating in a RT mode may help improve the ability to detect issues that may arise.

Figure 2:
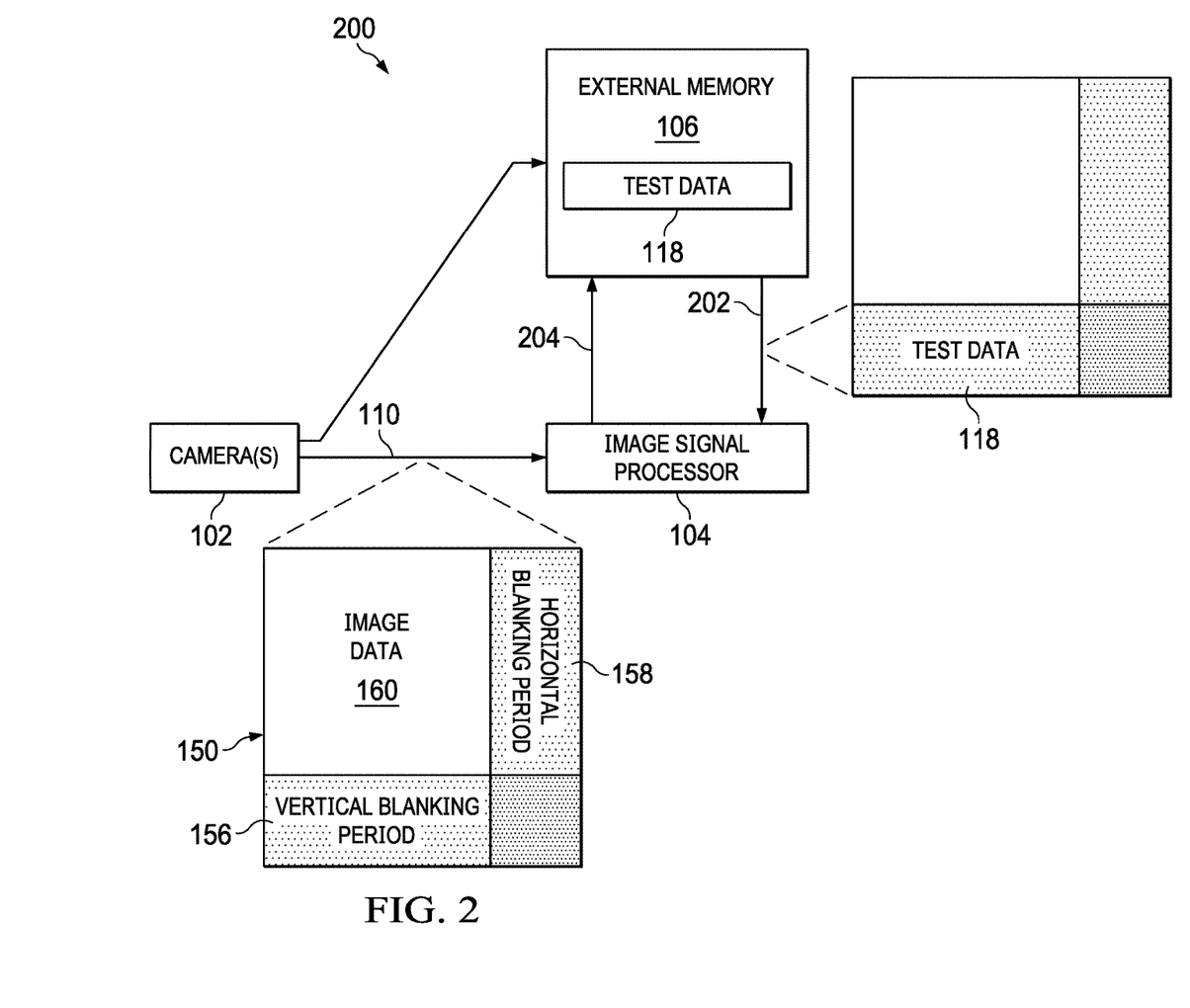
FIG. 2 is a block diagram illustrating a technique for fault detection while the image pipeline is operating in a RT mode, in accordance with aspects of the present disclosure.

FIG. 2 is a block diagram 200 illustrating a technique for fault detection while the image pipeline is operating in a RT mode, in accordance with aspects of the present disclosure. In this example, the ISP 104 is operating in a RT mode and is continuously receiving an input signal 110 from the cameras 102. As shown, the input signal 110 corresponds to input frame 150, which includes image data 160, along with vertical blanking period 156 and horizontal blanking period 158. In accordance with aspects of the present disclosure, the ISP may be switched to a non-RT mode, test data 118 may be input 202 to the ISP 104 from the external memory 106, the ISP 104 may process the test data 118 as a test frame, and the ISP 104 may output 204 the processed test frame to the external memory 106 during a time period 206 corresponding to the vertical blanking period 156. In some cases, this fault detection test may be performed by running one or more built-in self-tests rather than, or in addition to, processing the test data 118. To help facilitate this process, the ISP 104 may be configured with one or more features to help the ISP 104 rapidly switch between the RT mode and the non-RT mode and vice versa. Additionally, the ISP 104 may be configured to force a switch back to the RT mode from the non-RT mode to process a next frame from the camera in case processing the test data 118 takes more time than expected, for example due to heavy memory use/traffic, etc.

Figure 3:
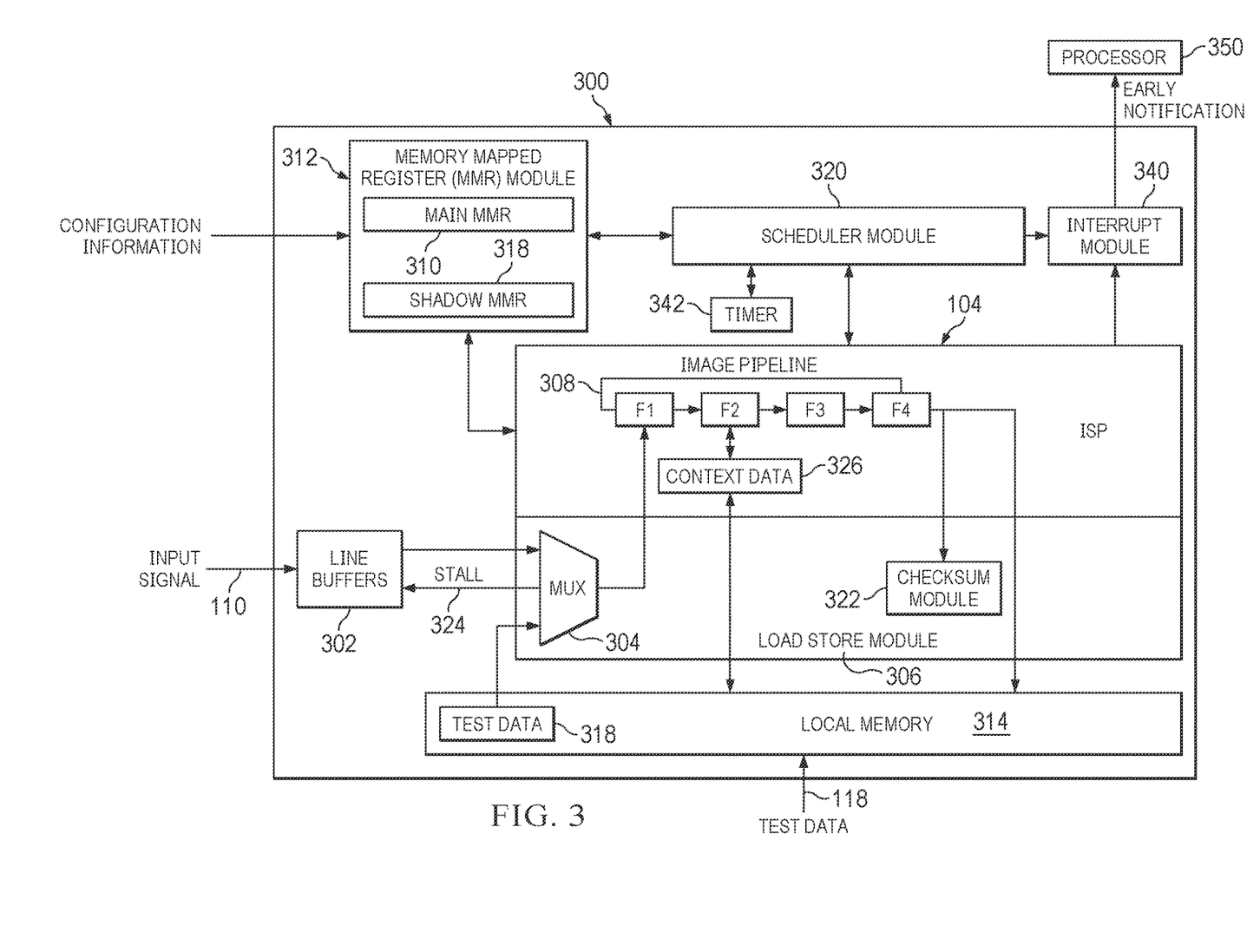
FIG. 3 is a block diagram illustrating an imaging hardware accelerator configured to perform fault detection while the image pipeline is operating in a RT mode, in accordance with aspects of the present disclosure.

FIG. 3 is a block diagram illustrating an imaging hardware accelerator 300 configured to perform fault detection while the image pipeline is operating in a RT mode, in accordance with aspects of the present disclosure. As a part of processing an image frame from a camera, an input signal 110 from the camera may be received by one or more line buffers 302. The line buffers 302 may output the input signal 110 to a multiplexer (e.g., MUX) 304 of a load store module 306 of the ISP 104. Absent an indication to perform fault detection, the multiplexer 304 passes the data from the line buffers to an image pipeline 308 for processing. The image pipeline 308 may be configured to process the data based on configuration information stored in the main memory mapped register (MMR) 310 of the MMR module 312. In this example, the image pipeline includes four stages, F1 . . . F4. After processing, output of the image pipeline 308 may be written to a local memory 314.

The image hardware accelerator 300 may be configured to issue early notifications to help perform fault detection during the vertical blanking period. For example, the image hardware accelerator 300 may include an interrupt module 340 coupled to the ISP 104. Immediately before or after the ISP 104 begins processing the input signal 110 for a frame, the interrupt module 340 may output an indication that processing of the input signal 110 has begun. In some cases, this indication may be an interrupt. In some cases, the scheduler module 320 may indicate, to the interrupt module 340 to issue a notification indicating that processing of the input signal 110 has begun. As an example, an interrupt that processing of the input signal 110 has begun may be received by a processor 350. The processor may be external to the imaging hardware accelerator. The processor may determine that a fault detection test should be performed, for example, based on an amount of time since a previous fault detection test. The processor may configure the ISP to perform the fault detection test as well as configure the ISP to switch from the RT mode to the non-RT mode for the fault detection test. The processor may then indicate to the image hardware accelerator 300 to perform the fault detection test. To configure the ISP, the image hardware accelerator 300 may copy test data 118 associated with the fault detection, for example from external memory, into a local memory 314 of the imaging hardware accelerator 300. Based on the indication that processing of the input signal 110 has begun, the processor may also load configuration information for processing the test data 316 into the shadow MMR 318 of the MMR module 312 and configure the ISP to switch from the RT mode to the non-RT mode.

A scheduler module 320 handles sequencing the operations of the imaging hardware accelerator 300, including operations executed by the image pipeline 308. For example, the scheduler module 320 may direct the ISP 104 to process input data from the line buffers 302 until the vertical blanking period is reached. Based on the indication to perform the fault detection test, the scheduler module 320 may this direct the ISP 104 to process the test data 318 when the vertical blanking period is reached. For example, the scheduler module 320 may indicate to a multiplexer 304 to switch the input for the image pipeline 308. The scheduler may sequence the operations based on configuration in the main MMR 310 and shadow MMR 318.

The multiplexer 304 of the load store module 306 of the ISP 104 may then switch the input of the image pipeline 308 from the input data from the line buffers 302 to the test data 318 input from the local memory 314. The test data 318 is passed on to the ISP 104 for processing in the image pipeline 308 based on the configuration information in the shadow MMR 318. The shadow MMR 310 includes configuration registers which correspond to configuration registers in the main MMR 310. In some cases, the shadow MMR 318 includes fewer configuration registers than the main MMR 310. For example, the shadow MMR 318 may include configuration register for the ISP 104, scheduler module 320, etc. sufficient for configuring the ISP 104 to perform the fault detection test on the test data 318, but may not include configuration registers for controlling other functionality of the imaging hardware accelerator, which may be present in the main MMR 310.

During the processing of the test data 318, configuration information for processing the next frame may be loaded into the main MMR 310, for example by the processor 350. During the processing of the test data 318 configuration information for processing the next frame may be loaded into the main MMR 310 along with configuration information to switch the ISP from the non-RT mode into the RT mode to process the next frame from the camera. For example, the interrupt module 340 may, after processing of the test data 318 has begun, issue a notification indicating that the test data 318 is being processed. In some cases, the scheduler module 320 may indicate, to the interrupt module 340 to issue the notification indicating that the test data 318 is being processed.

The output of the image pipeline 308 based the test data 318 may passed to the checksum module 322 of the load store module 306. The checksum module 322 may determine a checksum of the output from processing of the test data 318 and compare the checksum, for example, to known good values.

In some cases, context data 326 from a frame may be used as a part of processing a next frame. For example, context data 326 may be used as between frames for a tone mapping operation and/or for temporal noise filtering. In this example, the F2 stage of the image pipeline 308 generates context data 326 in a current frame for use by a next frame. To help enable the context data 326 to be available for the next frame when a the test data 318 is being processed during the vertical blanking period of the current frame, the context data 326 may be written to the local memory 314 during processing of the current frame. During processing of the next frame, the context data 326 may be reloaded from the local memory 314.

Figure 4:
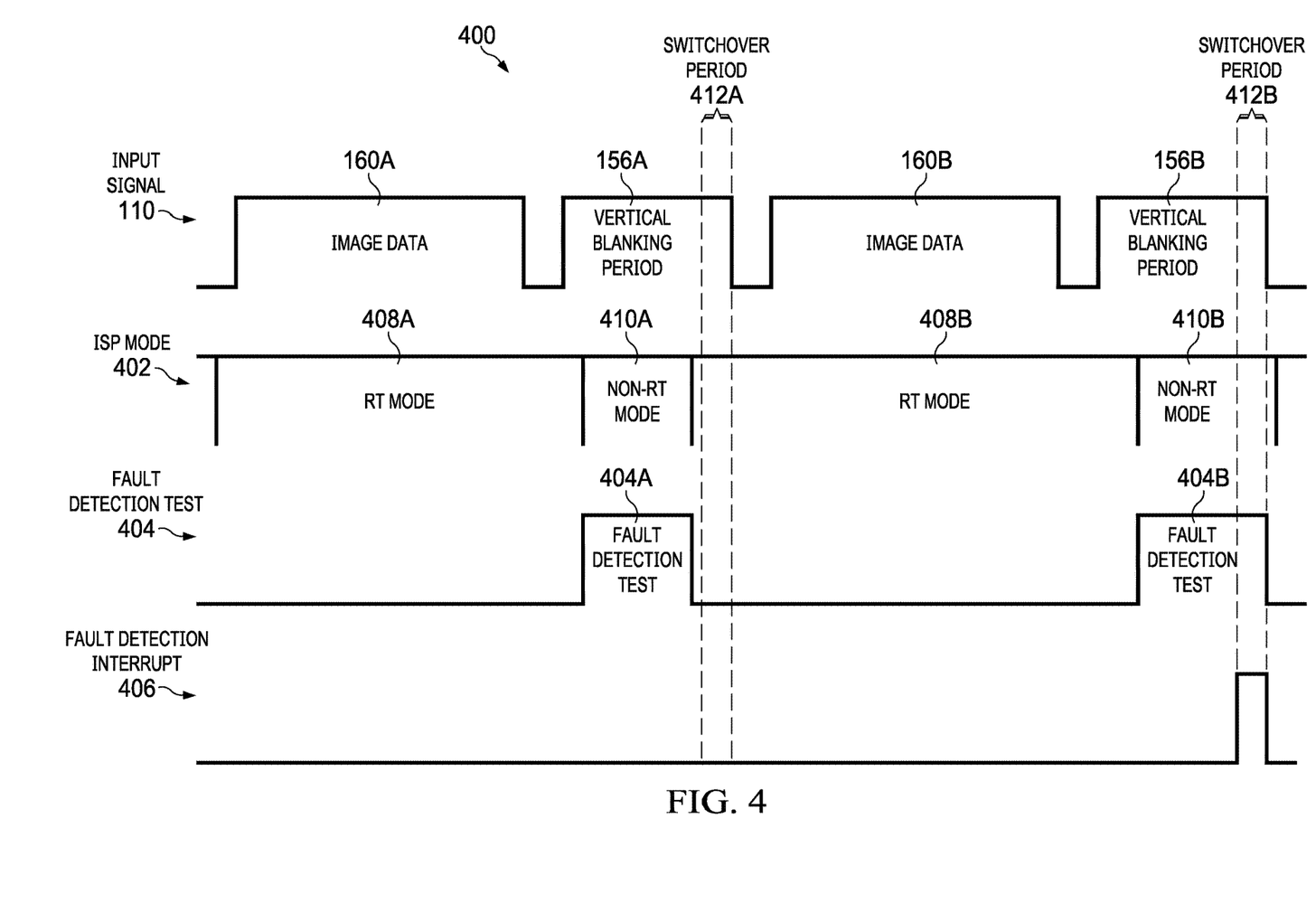
FIG. 4 is a timing diagram illustrating timings for executing fault detection tests in a vertical blanking period, in with aspects of the present disclosure.

FIG. 4 is a timing diagram 400 illustrating timings for executing fault detection tests in a vertical blanking period, in accordance with aspects of the present disclosure. As shown, the timing diagram 400 illustrates operational timings of an input signal 110, an ISP mode 402, a fault detection test 404, and a fault detection test interrupt 406. The input signal 110 illustrates portions of the input signal 110 being input to the ISP. The ISP mode 402 line indicates an operating mode of the ISP. The fault detection test 404 line indicates whether a fault detection test 404 is being executed. The fault detection interrupt 406 line indicates whether a fault detection interrupt 406 has been triggered. In some cases, the fault detection test may not be completed before the ISP needs to switch back into the RT mode to process the next frame after the vertical blanking period of the current frame. In such cases, the fault detection interrupt 406 may be triggered.

As shown, as image data 160A for a first frame is being received from the camera, the ISP mode 402 of an ISP is RT mode 408A. In this example, fault detection test 404A is scheduled for the vertical blanking period 156A of the first frame and the ISP switches into a non-RT mode 410A to perform the fault detection test 404A. The ISP may need a certain amount of time to switch between the non-RT mode and the RT mode. Time allocated for this switch is illustrated in timing diagram 400 as the switchover period 412A and 412B (collectively 412). The switchover period 412 may include the time needed to perform the switch between the non-RT mode and the RT mode, as well as pad time. As fault detection test 404A ends prior to switchover period 412A, the ISP can switch over to RT mode 408B prior to receiving image data 160B.

Continuing this example, fault detection test 404B is scheduled for vertical blanking period 156B of a second frame. The ISP switches into a non-RT mode 410B during vertical blanking period 156B to perform fault detection test 404B. However, fault detection test 404B does not finish prior to switchover period 412B. Where the fault detection test extends into the switchover period, the ISP may not be able to switch back over to the RT mode to be process the image data for the next frame in time. One technique to avoid the ISP not being able to switch back to the RT mode in time is to define the switchover period 412 sufficiently large as to encompass any delays the fault detection test may encounter. However, such a large switchover period may not be an efficient usage of the vertical blanking period.

As discussed above, in some cases, the fault detection test may not execute to completion during the vertical blanking period. For example, memory congestion may cause a fault detection test to take longer to execute than expected. Where the fault detection test takes longer to complete than expected, the ISP may not be able to switch back to the RT mode in time to process image data for the next frame. To help ensure a timely switch back to the RT mode, the ISP may be configured to switch back to the RT mode from the non-RT mode before the fault detection test is completed. Returning to FIG. 3, the image hardware accelerator 300 may include a timer 342 coupled to the scheduler module 320. In some cases, the timer 342 may be separate from the image hardware accelerator 300 and the timer 342 may be set/reset, for example, by a process executing on a processor. The timer 342 may be configured to determine a time to stop processing the test data in the non-RT mode and switch back to the RT mode to process the next frame. For example, the timer 342 may count a time between the beginning of the vertical blanking period and a beginning of a switchover period and send an indication to the scheduler module 320 when the time is reached. When a vertical blanking period to be used for a fault detection test starts, the timer 342 may also be started. If timer 342 expires before the fault detection test is finished, the timer may indicate to stop the processing of the test data 318. For example, expiration of the timer may raise an exception to a process executing on the processor, which may then initiate an abort process of the scheduler module 320, for example, by setting a register in the main MMR 310 or shadow MMR 318. The scheduler module 320 may then indicate to the ISP 104 to stop the processing of the test data 318. For example, the image pipeline may indicate to the scheduler module when the image pipeline has finished processing a given frame. The scheduler module may determine that the image pipeline has not yet finished processing the test data as the scheduler module has not received the indication that the image pipeline has finished processing the test data.

The load store module 306 of the ISP 104 may also send a stall indication 324 to the line buffers 302. Based on the stall indication 324, the line buffers 302 may begin buffering the received input signal 110 from the cameras. This buffering helps provide additional time to perform the ISP mode switch to the RT mode. After the ISP mode switch is completed, the stall indication 324 may be stopped and the input signal 110 stored in the line buffers 302 may be sent to the image pipeline 308 for processing.

Figure 5:
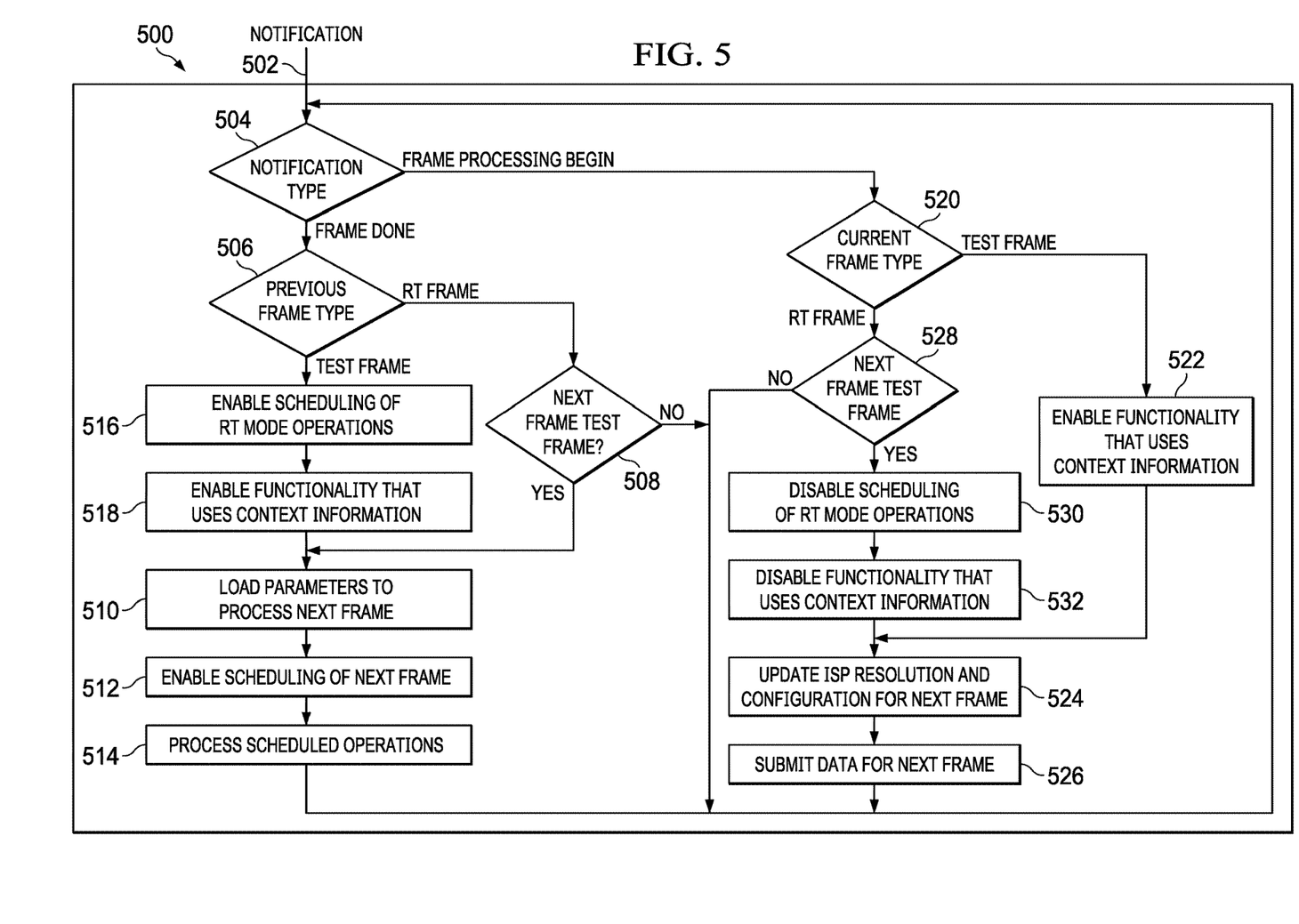
FIG. 5 is a flow diagram illustrating an example control loop for configuring the image hardware accelerator, in accordance with aspects of the present disclosure.

FIG. 5 is a flow diagram 500 illustrating an example control loop for configuring the image hardware accelerator, in accordance with aspects of the present disclosure. In some cases, this control loop may be performed by a controller of the ISP. This controller may be, for example, a software control module, such as a driver, executing on a processor separate from the ISP. The flow diagram 500 begins when a notification 502 is received at block 504. If the notification 502 is an indication that processing a previous frame is done, execution proceeds to block 506. At block 506, if the previous frame type was a RT frame (e.g., regular image frame), execution proceeds to block 508. At block 508, if the next frame is not a test frame, execution returns to block 504. If, at block 508, the next frame is a test frame (e.g., a fault detection test is to be performed during the vertical blanking period of the current frame), the execution proceeds to block 510. At block 510, the parameters to process the next frame may be loaded. For example, parameters for the load store module and scheduler module may be loaded from the shadow MMR if the next frame is a test frame. Alternatively, parameters may be loaded form the main MMR if the next frame is a RT frame. At block 512, scheduling of the operation may be performed. For example, the scheduler module may schedule the processing of the next frame. At block 514, the scheduled operations are processed by the ISP. For example, the ISP may switch to the non-RT mode and begin processing the test frame or the ISP may begin processing the next RT frame. Execution may then return to block 504 if another notification 502 is received.

Returning to block 506, if the previous frame was a test frame (e.g., for performing a fault detection test), then execution proceeds to block 516. At block 516, scheduling of RT mode operations are enabled. At block 516, scheduling of RT operations are enabled. For example, RT mode operations scheduling may be disabled as a part of switching to a non-RT mode, and the RT mode operations scheduling may be reenabled. At block 518, functionality that uses context data may be enabled. For example, tone mapping and/or temporal noise filtering may use context data across multiple frames and this functionality may be reenabled after performing the fault detection test on a test frame. After block 518, execution proceeds to block 510, as described above.

Returning to block 504, if the notification 502 is an indication that frame processing has begun, execution proceeds to block 520. At block 520, if the current frame is a test frame, execution proceeds to block 522. At block 522, functionality that uses context data may be enabled. For example, as the current frame is a test frame, the next frame will be a RT frame which may use features that use context data across multiple frames. This functionality may be enabled for the next RT frame. At block 524, the ISP may be updated with resolution and configuration information. For example, configuration information from the main MMR and shadow MMR may be loaded into the ISP. At block 526, the configuration data may be submitted for the next frame. Execution then returns to block 504.

At block 520, if the current frame is an RT frame, execution proceeds to block 528. At block 528, if the next frame is not a test frame, execution returns to block 504. If, at block 528, the next frame is a test frame, scheduling of RT mode operations are disabled at block 530. At block 532, functionality that uses context data may be disabled. After bock 532, execution proceeds to block 524, as described above.

Figure 6:
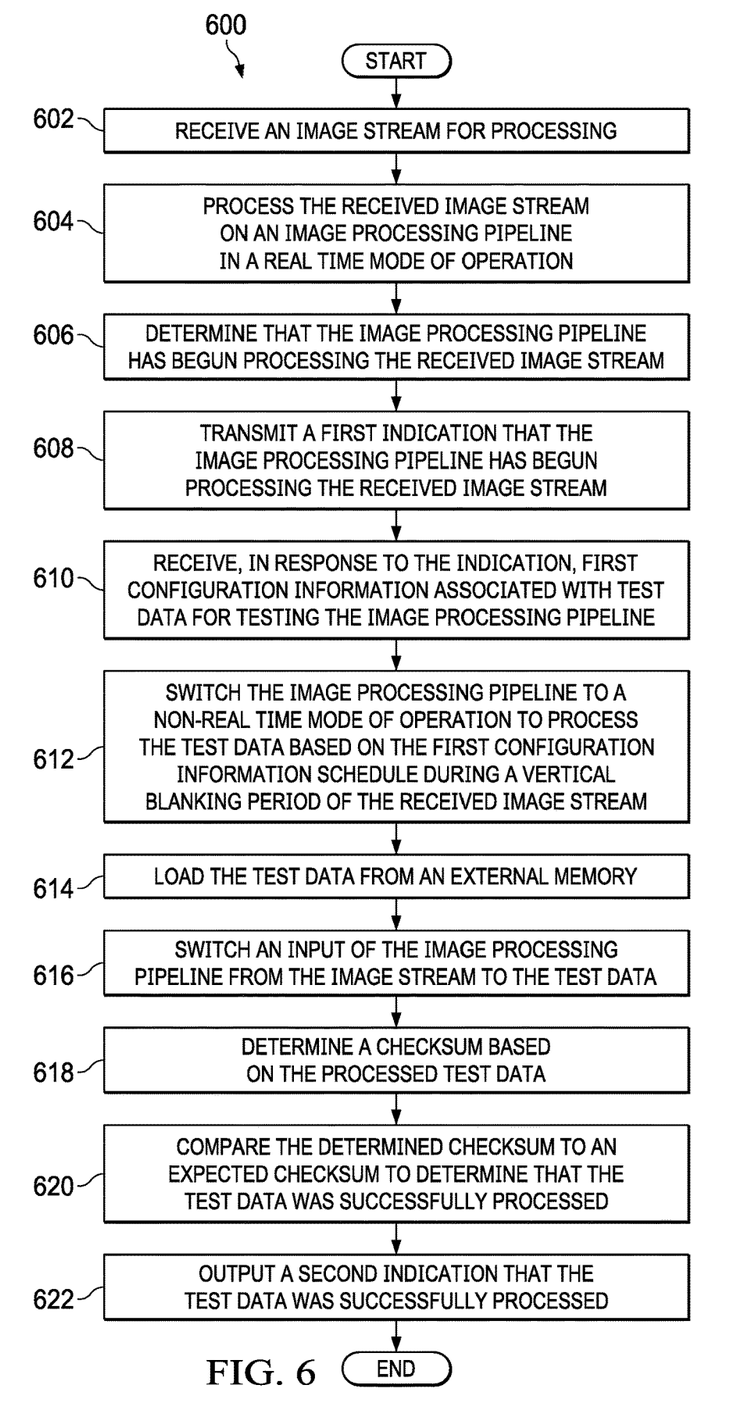
FIG. 6 is a flowchart illustrating a technique for fault detection testing, in accordance with aspects of the present disclosure.

FIG. 6 is a flowchart 600 illustrating a technique for fault detection testing, in accordance with aspects of the present disclosure. At block 602, an image stream is received for processing. For example, an image processing pipeline of an ISP may receive an image stream from a camera for processing. At block 604, the received image stream is processed in a real time mode of operation. For example, the ISP may be operating in a real time mode where images are received (e.g., streamed) from the camera periodically, for example at 30 frames per second, and the received images of the image stream are each processed within a certain time period by the ISP to keep up with the image stream. At block 606, a determination is made that the image processing pipeline has begun processing the received image stream. For example, a scheduler module may be configured to receive notifications from the image processing pipeline and may receive a notification that the image processing pipeline has begun processing portions of an image (e.g., frame) from the image stream. The determination that the processing has begun may be made based on the notification. At block 608, an indication that the image processing pipeline has begun processing the received image stream may be output. For example, the scheduler module may be coupled to an interrupt module and the interrupt module may transmit a notification that the processing the received image stream has begun. As a more detailed example, the notification may be sent after a first line or two of the frame from the image stream are processed. At block 610, first configuration information is received in response to the indication, the first configuration information associated with test data for testing the image processing pipeline. For example, configuration information for configuring the ISP for processing the test data may be received. This configuration information may be received while the received image stream is being processed. In some cases, the configuration information may be received in a shadow MMR. At block 612, the image processing pipeline is switched to a non-real time mode of operation to process the test data based on the first configuration information during a vertical blanking period of the received image stream. For example, frames of the received image may include a vertical blanking period where useable image data is not being streamed. The test data may be processed during those periods. As a part of processing the test data, the ISP may be switched from a real-time image processing mode to a non-real time image processing mode. For example, the ISP may include a multiplexer and the multiplexer may be configured to switch the input to the image processing pipeline during the vertical blanking period. At block 614, test data may be loaded from an external memory. For example, the test data may be stored in an external memory and the test data may be loaded into a local memory of the image processing device. At block 616, the image processing pipeline is switched from processing the image stream to the test data. At block 618, a checksum is determined based on the processed test data. For example, a checksum module may be configured to determine a checksum based on output of the image pipeline from the test data. At block 620, the determined checksum is compared to an expected checksum to determine that the test data was successfully processed. At block 622, an indication that the test data was successfully processed is output. For example, the scheduler may output a notification that the test data was successfully processed.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. Circuits described herein are reconfigurable to include additional or different components to provide functionality at least partially similar to functionality available prior to the component replacement. Modifications are possible in the described examples, and other examples are possible within the scope of the claims.

What is claimed is:

1. A device, comprising:
an image signal processor including an image processing pipeline; and
a scheduler module configured to:
determine that the image processing pipeline has begun processing image data;
based on determining that the image processing pipeline has begun processing the image data, cause the image processing pipeline to receive first configuration information associated with testing the image processing pipeline; and
during a blanking period of the image data,
stop the image processing pipeline from processing the image data;
cause the image processing pipeline to process test data based on the first configuration information;
receive a first indication to stop the image processing pipeline from processing the test data;
determine whether the image processing pipeline would have completed processing the test data when stopping the image processing pipeline from processing the test data; and
based on determining that the image processing pipeline would not have completed processing the test data, generate a second indication that processing of the test data is not completed.

2. The device of claim 1, wherein the scheduler module is further configured to:
receive the first indication prior to a switchover period before an end of the blanking period of the image data.

3. The device of claim 1, further comprising:
a timer circuit configured to generate the first indication.

4. The device of claim 1, wherein the scheduler module is further configured to:
based on receiving the first indication, stop the image processing pipeline from processing the test data; and
cause the image processing pipeline to resume processing the image data.

5. The device of claim 4, wherein the scheduler module is further configured to:
during the blanking period of the image data, cause the image processing pipeline to receive second configuration information associated with processing the image data; and
cause the image processing pipeline to resume processing the image data based on the second configuration information.

6. The device of claim 1, further comprising:
a multiplexer configured to provide either the image data or the test data to the image processing pipeline.

7. The device of claim 6, further comprising:
a buffer coupled to the multiplexer and configured to:
receive a portion of the image data;
receive a third indication to stall;
based on receiving the third indication, store the received portion of the image data; and
receive a fourth indication to stop stalling; and
based on receiving the fourth indication, provide the stored portion of the image data to the multiplexer.

8. The device of claim 6, further comprising:
a memory coupled to the multiplexer and configured to store the test data.

9. The device of claim 1, further comprising:
a checksum module configured to:
receive an output from the image processing pipeline based on the processing of the test data;
determine a checksum based on the output; and
determine whether a fault exists in the image processing pipeline based on the checksum.

10. The device of claim 1, further comprising:
a memory mapped register (MMR) configured to store the first configuration information,
wherein the scheduler module is configured to:
based on determining that the image processing pipeline has begun processing the image data,
generate a fifth indication that the image processing pipeline has begun processing the image data; and
cause the image processing pipeline to receive the first configuration information from the MMR in response to the fifth indication.

11. A non-transitory computer readable medium storing instructions that, when executed by a processor, cause the processor to:
determine that an image processing pipeline of an image signal processor has begun processing image data;
based on determining that the image processing pipeline has begun processing the image data, cause the image processing pipeline to receive first configuration information associated with testing the image processing pipeline; and
during a blanking period of the image data,
stop the image processing pipeline from processing the image data;
cause the image processing pipeline to process test data based on the first configuration information;
receive a first indication to stop the image processing pipeline from processing the test data;
determine whether the image processing pipeline would have completed processing the test data when stopping the image processing pipeline from processing the test data; and based on determining that the image processing pipeline would not have completed processing the test data, generate a second indication that processing of the test data is not completed.

12. The non-transitory computer readable medium of claim 11, wherein the instructions further cause the processor to:
receive the first indication prior to a switchover period before an end of the blanking period of the image data.

13. The non-transitory computer readable medium of claim 11, wherein the first indication is generated by a timer circuit.

14. The non-transitory computer readable medium of claim 11, wherein the instructions further cause the processor to:
based on receiving the first indication,
stop the image processing pipeline from processing the test data; and
cause the image processing pipeline to resume processing the image data.

15. The non-transitory computer readable medium of claim 14, wherein the instructions further cause the processor to:
during the blanking period of the image data, cause the image processing pipeline to receive second configuration information associated with processing the image data; and
cause the image processing pipeline to resume processing the image data based on the second configuration information.

16. The non-transitory computer readable medium of claim 11, wherein the image data and test data are provided to the image processing pipeline through a multiplexer.

17. The non-transitory computer readable medium of claim 16, wherein the image data is provided to the multiplexer through a buffer, and wherein the buffer is configured to:
receive a portion of the image data;
receive a third indication to stall;
based on receiving the third indication, store the received portion of the image data; and
receive a fourth indication to stop stalling; and
based on receiving the fourth indication, provide the stored portion of the image data to the multiplexer.

18. The non-transitory computer readable medium of claim 16, wherein the test data is provided from a memory to the multiplexer, and wherein the memory is external to the image signal processor.

19. The non-transitory computer readable medium of claim 11, wherein the instructions further cause the processor to:
cause determination of a checksum based on the processing of the test data; and
cause determination whether a fault exists in the image processing pipeline based on the checksum.

20. The non-transitory computer readable medium of claim 11, wherein the instructions further cause the processor to:
based on determining that the image processing pipeline has begun processing the image data,
generate a fifth indication that the image processing pipeline has begun processing the image data; and
cause the image processing pipeline to receive the first configuration information from a memory mapped register (MMR) in response to the fifth indication.

* * * * *